No. 895,375. PATENTED AUG. 4, 1908.
C. W. KREIDLER.
POULTRY ROOST.
APPLICATION FILED NOV. 27, 1907.
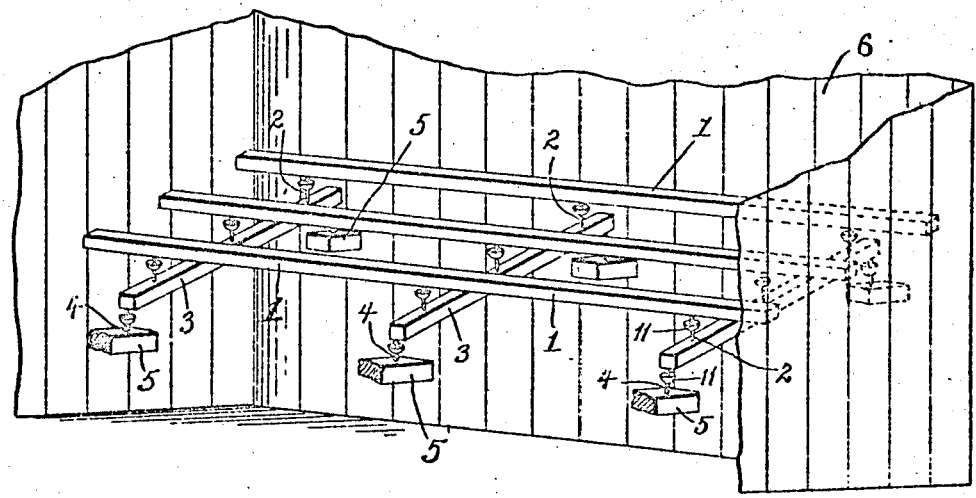
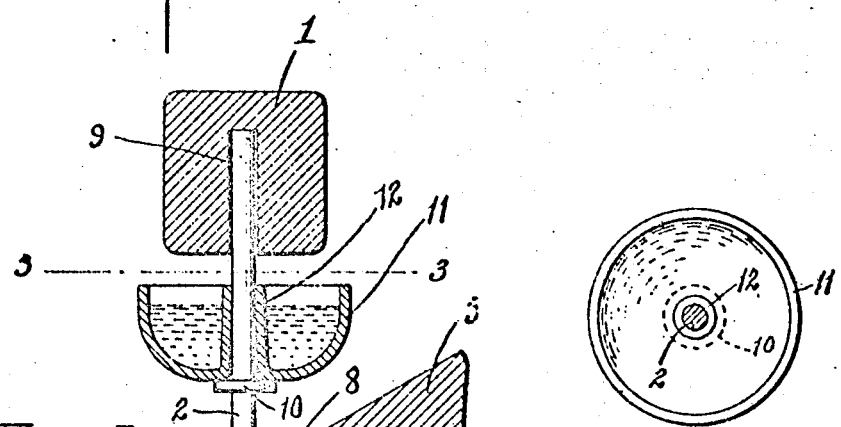
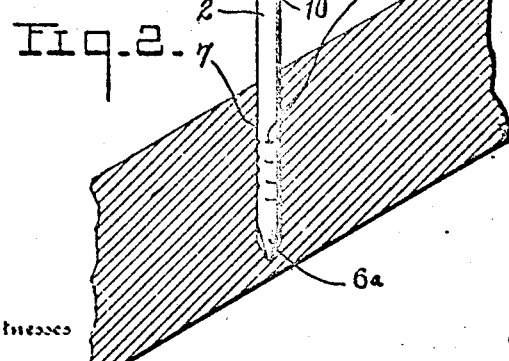
Witnesses
Chas. T. Jennings.
L. I. Little.
Inventor
Charles W. Kreidler
By Watson E. Coleman
Attorney

UNITED STATES PATENT OFFICE.

CHARLES W. KREIDLER, OF CHICAGO, ILLINOIS.

POULTRY-ROOST.

No. 895,375.　　　Specification of Letters Patent.　　　Patented Aug. 4, 1908.

Application filed November 27, 1907. Serial No. 404,089.

*To all whom it may concern:*

Be it known that I, CHARLES W. KREIDLER, a citizen of the United States, residing at Chicago, in the county of Cook and State of Illinois, have invented certain new and useful Improvements in Poultry-Roosts, of which the following is a specification, reference being had to the accompanying drawings.

My invention relates to improvements in poultry roosts and consists of the novel features of construction and the combination and arrangement of parts hereinafter described and claimed.

The object of the invention is to provide a simple and practical poultry roost which will effectively prevent the spread of lice and other insects and which may be readily taken apart and cleaned.

The above and other objects of the invention are attained in the preferred embodiment of the same illustrated in the accompanying drawings, in which Figure 1 is a sectional perspective of a poultry house showing my improved roost therein; Fig. 2 is a detail vertical section through one of the roosting bars, a portion of one of the supporting bars and one of the cups; and Fig. 3 is a detail section taken on the plane indicated by the line 3—3 in Fig. 2.

My improved roost comprises roosting bars 1 removably mounted upon the upper ends of upright supporting pins 2 which may be arranged upon any suitable supporting structure, the latter, however, is preferably in the form of a plurality of bars 3 arranged at right angles to the roosting bars and supported upon similar pins 4 which are in turn arranged on suitable supports 5. These supports 5 are shown in Fig. 1 as blocks secured upon the opposite walls of the poultry house 6. Any suitable number of the supporting bars 3 may be employed and they are preferably arranged in parallel relation and at an inclination as more clearly shown in Fig. 2. This inclination of the supporting bars causes the roosting bars 1, which are preferably parallel, to be disposed in different horizontal planes so that the poultry may readily mount the lowermost roosting bars and then jump to the upper ones. The supporting pins 2, 4 have pointed lower ends 6 adapted to be driven into vertical sockets 7 formed in the bars 3 and the blocks or brackets 5, and said ends of the pins are also formed with upwardly projecting spurs 8 which prevent the casual disengagement of the pins from the sockets 7. Vertical sockets 9 are formed in the bottom faces of the roosting bars 1 and the supporting bars 3 for the reception of the upper ends of the pins 2, 4, said sockets 9 being somewhat larger in diameter than said pins so that the bars 1, 3 may be readily removed from the pins when it is desired to disassemble the roost for cleaning or other purposes.

Arranged upon the pins 2, 4 at points intermediate their ends are annular flanges or collars 10 which form supporting shoulders for removable liquid receptacles 11 in the form of cups. The latter are preferably hemi-spherical or cylindrical and formed at their center with an upright concentric tubular stem 12 adapted to receive the upper portion of one of the supporting pins. The tubular stems 12 are adapted to snugly fit the supporting pins so as to prevent the passage of lice or other insects between the stems and pins. When the cups 11 are arranged upon the pins they engage the shoulders or collars 10 and are supported thereby as shown in Fig. 2. It will be seen that when liquid is placed in the cups 11 it will be impossible for lice or other insects to climb up the pins and over the cups, especially when such liquid is an oil or a special preparation for killing them.

From the foregoing it will be seen that my improved roost is exceedingly simple and inexpensive in construction, that it may be quickly and easily set up and as readily taken down for cleaning or other purposes, and that the provision of the liquid cups upon the supporting pins will effectively prevent the spread of lice or other insects from one part of the structure to another.

Having thus described my invention wha I claim is:

1. In a poultry roost, the combination of inclined supporting bars formed with vertical sockets, upright pins having their lower ends removably inserted in said sockets, said pins being provided intermediate their ends with annular collars to provide supporting shoulders, liquid receptacles having centrally disposed tubular stems projecting from their bottom to their top and adapted to fit over the upper ends of said pins, said receptacles being adapted to rest upon the supporting shoulders formed by said collars, and a horizontal roosting bar formed in its bottom with vertical sockets to receive the upper ends of said pins whereby said roosting bar will be removably supported upon the latter and spaced above said receptacles, substantially as described.

2. In a poultry roost, the combination of a support or frame, brackets upon the same, vertical pins in said brackets and formed with stop shoulders, liquid cups removably arranged upon said pins and supported by said shoulders, inclined supporting bars formed in their bottom faces with sockets to receive the upper ends of said pins whereby they are removably supported upon the latter, other vertical pins projecting upwardly from said supporting bars and formed with stop shoulders, liquid cups removably arranged upon the last mentioned supporting pins and adapted to engage said shoulders, and parallel roosting bars arranged at right angles above the supporting bars and formed in their bottom faces with sockets to receive the upper ends of the last mentioned pins whereby said roosting bars are removably mounted upon the latter, substantially as described.

In testimony whereof I hereunto affix my signature in the presence of two witnesses.

CHARLES W. KREIDLER.

Witnesses:
GEORGE JOHNSTON,
CHARLES BEAL.